United States Patent
Bacher et al.

(10) Patent No.: US 6,244,962 B1
(45) Date of Patent: Jun. 12, 2001

(54) TORQUE DAMPER AND DAMPING DEVICE EQUIPPED WITH SUCH A TORQUE DAMPER

(75) Inventors: Michel Bacher, Andilly; Josip Kovac, Ozoir la Ferriere; Patrick Lucsak, Verquin, all of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/125,675

(22) PCT Filed: Dec. 22, 1997

(86) PCT No.: PCT/FR97/02384

§ 371 Date: Dec. 31, 1998

§ 102(e) Date: Dec. 31, 1998

(87) PCT Pub. No.: WO98/28553

PCT Pub. Date: Jul. 2, 1998

(30) Foreign Application Priority Data

Dec. 23, 1996 (FR) .................................................. 96 15863

(51) Int. Cl.[7] ............................... F16D 3/12; F16D 47/02
(52) U.S. Cl. .............................. 464/68; 192/212; 464/67
(58) Field of Search ..................... 192/203, 205, 192/203.2, 212; 464/61, 62, 63, 64, 66, 67, 68, 81, 82, 160, 98, 99; 267/180

(56) References Cited

U.S. PATENT DOCUMENTS

| | | | |
|---|---|---|---|
| 2,356,940 | * | 8/1944 | Marison ............................... 267/180 |
| 2,643,109 | * | 6/1953 | Wood .................................. 267/180 |
| 4,518,071 | * | 5/1985 | Nozawa ............................. 192/106.2 |
| 4,679,678 | * | 7/1987 | Habel, Jr. et al. ................ 192/106.2 |
| 4,789,375 | * | 12/1988 | Bassett .................................. 464/68 |
| 4,891,033 | * | 1/1990 | Heyser ................................... 464/68 |
| 5,004,088 | * | 4/1991 | Bolton ............................... 192/106.2 |
| 5,052,664 | | 10/1991 | Lesher et al. . |
| 5,289,737 | * | 3/1994 | Kuhne .................................... 464/66 |
| 5,769,722 | * | 6/1998 | Uehara .................................. 464/66 |

FOREIGN PATENT DOCUMENTS

| | | |
|---|---|---|
| 032533 | 2/1989 | (EP) . |
| 2105005 | 3/1983 | (GB) . |
| 2138105 | 10/1984 | (GB) . |

OTHER PUBLICATIONS

Patent Abstracts of Japan vol. 014, No. 127 (M–0947), Mar. 9, 1990 & JP 01 320330 A (murata Hatsujo KK), Dec. 26, 1989.

* cited by examiner

Primary Examiner—Lynne H. Browne
Assistant Examiner—Kenneth Thompson
(74) Attorney, Agent, or Firm—Liniak, Berenato, Longacre & White

(57) ABSTRACT

The invention concerns a torque damper arranged between two rotating elements, an input element (51) and an output element (61), comprising resilient members (60) with circumferential action, two guide washers (52, 53) associated with (51) one of the elements and axially arranged on either side of a disc (54) associated with the other (61) element, the resilient members (60) operating between the two guide washers (52, 53) and the disc (54) by being placed in windows (64, 65, 66) located one opposite the others arranged in the guide washers (52,53) and in the disc (54), said windows (64, 65, 66) having two side edges (75, 76), on which are adapted to be urged to rest the ends of the resilient members (60) which form between them an angle (60) opening outward, the axis (70) of the resilient members (60) being a non-rectilinear curve with its concavity directed towards the common rotation axis of the input (51) and output (61) elements, such that the bearing surfaces of the ends of said resilient members (80) form between them the same angle (67).

14 Claims, 4 Drawing Sheets

TORQUE DAMPER AND DAMPING DEVICE EQUIPPED WITH SUCH A TORQUE DAMPER

STATE OF THE ART

The present invention concerns torsion dampers and damping devices equipped with such torsion dampers, such as the devices which are for example incorporated in clutch friction members for motor vehicles.

Clutch friction members are known, equipped with a torsion damping device comprising two torsion dampers: a main damper and a predamper.

The main damper has an input element fixed to two guide washers disposed on each side of a disc. The guide washers are connected together by struts, which fix them to each other. The input element consists, in the case of an application to a clutch friction member, of a support disc on each face of which friction linings are fixed, intended to be clamped between the thrust and reaction plates of the clutch.

As a variant, the input element can consist of a disc fixed directly to the vehicle engine flywheel; this can also be one of the guide washers which is extended radially and fixed directly to the engine flywheel.

The input element, when it is a case of a friction lining support disc, is pressed against one of the guide washers of the main damper whilst being fixed thereto by the struts or, as a variant, by specific rivets.

The struts pass through scallops formed at the periphery of the disc; in this case, the angular movement between the disc and guide washers is limited through the cooperation of the struts with the edge of the scallops.

As a variant, this limitation is achieved by the fact that the helical springs constituting circumferentially acting elastic members, here with high stiffness, elastically coupling the guidance washers and the disc, come to have contiguous turns.

The guide washers surround the output element of the damper device consisting in general of an internally fluted hub; the same applies to the disc of the main damper, which for its part meshes with clearance with the hub. The main damper is therefore kinematically driven directly by the input element.

The predamper is located between the disc and one of the guide washers of the main damper, and this radially below the springs of the main damper.

The predamper is placed kinematically directly upstream of the output element and also has two guide washers disposed on each side of a disc fixed with respect to rotation to the hub by means of teeth. Elastic members, such as helical springs, elastically couple the disc of the predamper to its associated guide washers. This predamper disc is crimped to the hub.

In such a device with two dampers, the guide washers of the predamper are connected with respect to rotation to the disc of the main damper. The circumferentially acting springs of the predamper are less stiff than the circumferentially acting springs of the main damper.

The predamper is adapted to filter the vibrations in the idling range of the engine, whilst the main damper is adapted to filter the vibrations in the normal operating range of the vehicle, referred to as the running range, as from the idling range of the engine; the predamper can also be adapted to filter the vibrations in the running range at low engine torque.

The efficacy of a torsion damping device with regard to the low-frequency torsional vibrations in the vehicle running range, as from idling of the engine up to 2500 revolutions per minute, for example, requires a large angular movement between the driving element and the driven element, for example around 400, this movement taking place counter to circumferentially acting elastic members elastically coupling the guide washers and the disc of the main damper.

Generally, the elastic members are helical springs disposed in windows formed in the guide washers and the disc, respectively. The three windows receiving one and the same spring, namely the two windows in the guide washers and the window in the disc, are in line with each other; each of these windows has an internal edge, two lateral or support edges, and an external edge; as shown schematically in FIGS. 1 and 2, the windows 11 in the disc 1 and the windows 12 and 13 in the guide washers 2 and 3 respectively have an internal edge 14 and 114 and lateral edges 15, 16 and 115, 116 disposed along the three sides of a rectangle, the internal edge 14 or 114 extending along the length of the said rectangle; the external edge 17, 117 which faces the internal edge 14, 114 is curvilinear in shape with its concavity directed towards the internal edge 14, 114, in other words towards the axis 90 about which the disc 1 and guide washers 2 and 3 rotate in operation. In FIG. 1, the contours of these three windows have been superimposed in plan view for convenience of the drawing; in practice, where it is a case notably of the windows 12 and 13 in the guide washers 2 and 3, the lateral edges 115 and 116 are offset axially with respect to the internal 114 and external 117 edges, which form part of a flap 18, 19, as shown in FIG. 2; in FIG. 1, the external edge 117 and the internal edge 114 of the windows in the guide washers have been illustrated by a line representing the projection along the axis 90, in the plane of the figure, of the generator which guides the helical spring 20 radially; in order to facilitate reading of the drawing, the window in the disc 11 is in solid lines, the dotted lines designating a window formed in the guide washers.

The helical spring 20 is a conventional spring whose axis 21 is rectilinear; when the spring 20 is placed in the windows 11, 12 and 13, its axis 21 is parallel to the internal edge 14, 114 of the said windows and its end turns are in abutment on the lateral edges 15, 115 and 16, 116 of the said windows. The seating of the said end turns is perfect, and when there is a relative angular movement of the input element and output element, that is to way of the disc 1 and the guide washers 2 and 3, these end turns remain in contact with the said lateral edges, without any relative movement of the said turns with respect to the said lateral edges; there is therefore no parasitic friction, at the lateral edges 15, 115 and 16, 116, which might interfere with the calculated internal friction of the main damper for adjusting its hysteresis.

Unfortunately, the above arrangement has the drawback that, in operation, and in particular at the end of the relative angular movement, the spring 20 itself deforms so that its axis 21, initially rectilinear, adopts a curved shape, as shown in FIG. 3, whose concavity is turned towards the outside; consequently the spring 20 operates under poor conditions, the mean radius on which the tangential force due to the springs 20 is manifested decreasing, and it is difficult ultimately to control this force.

It will be understood that, the longer the springs 20, the greater this drawback. Naturally, in order to avoid this drawback, it is possible to use short springs, but this requires, in order to obtain a large movement, a large number of springs disposed in series, which results in a complex design having regard notably to the large number of components, to which there is added the difficulty of controlling the parasitic friction.

In order to avoid the curvilinear deformation of the axis 21 of the spring 20, notably at the end of movement, it has been proposed to associate different windows with the input element and output element, the windows in one of these two elements having lateral or support edges forming, with the internal edge, an angle slightly greater than a right angle; more precisely, as shown in FIG. 4, the windows formed in the guide washers, for example the windows 22, 23 in the figure, have lateral edges 35, 36 which are not parallel but inclined, which thus form an angle 38 with the lateral edges 15, 16 in the windows 11 of the disc 1; the angle 38 is designed so that, when the input element and the output element have effected their maximum relative movement, which corresponds to the columns which connect the guide washers coming into abutment on the edges of the scallops in the disc, the lateral edges 15 and 36 are parallel, as shown in FIG. 5; thus the ends of the spring 20 are parallel, or almost parallel, and the spring 20 operates under good conditions.

Unfortunately, the driving of the spring 20 by the inclined lateral edges 36, according to FIG. 4, is not centred with respect to the spring 20 since it occurs in the part of the end turns close to the axis of the input and output elements, represented diagrammatically by the point 39 in FIGS. 4 and 6; consequently the thrust 40, at this part, on the spring 20, breaking down into a transverse component 41 parallel to the axis of the spring 20 and a radial component 42, at the start of the relative movement of the spring 20 moves with respect to the edge 36 until it comes into abutment at 46 on the external edge 37 of the windows 22, 23: this results in parasitic friction, the drawback of which has already been described, and significant wear on the components.

It will be understood that everything which has just been stated is valid if the structures are reversed, that is to say if the input element is fixed to the disc and the output element fixed to the two guide washers. Likewise, the helical springs could be replaced by elastic members made of elastomeric material such as rubber, or composite material, for example bonded to two end dishes.

The object of the present invention is to avoid the drawbacks described above, inherent in the torsion damping devices known up until now.

SUMMARY OF THE INVENTION

According to the invention, a torsion damper disposed between two rotating elements, an input element and an output element, and having circumferentially acting elastic members, two guide washers associated with one of the elements and disposed axially on each side of a disc associated with the other one of the elements, the circumferentially acting elastic members having an axis and acting between the two guide washers and the disc whilst being placed in windows placed opposite each other and formed in the guide washers and in the disc, the said windows having two lateral edges on which the ends of the elastic members are adapted to be in abutment, is characterised by the fact that the lateral edges of each of the said windows form respectively in the guide washers and in the disc form between them an angle open towards the outside, the axis of the elastic members being a non-rectilinear curve with its concavity directed towards the common rotation axis of the input and output elements, so that bearing faces of the ends of the said elastic members form the same angle between them.

Advantageously, the said angle is such that, when the guide washers and the disc have effected their maximum relative movement in rotation, the lateral edges of the windows in the guide washers on which one end of the elastic members bear and the lateral edge of the window in the disc on which the other end of the elastic members bears are parallel, or almost parallel.

Preferably, the axis of the elastic members is a curvilinear curve in the form of an arc of a circle.

According to a variant, the axis of the elastic members consists of two rectilinear half-axes forming an obtuse angle between them.

According to another variant, the axis of the elastic members consists of three rectilinear segments forming, in pairs, an obtuse angle between them.

According to one embodiment, the elastic members are helical springs coiled around the axis and the end turns of the springs are closer together than the other turns.

By virtue of these arrangements, the torsion damper according to the invention, whilst having long circumferentially acting elastic members, does not give rise to parasitic friction because the elastic members are acted on along their axis, the wear on the parts thereby being reduced to the minimum; moreover, the elastic members work under good conditions, notably at the end of movement, where their end faces are parallel.

In all the above, account has not been taken of the effects of the centrifugal force to which the elastic members are subjected in operation. However, as is known, whilst the torque transmitted by the elastic members, for example the springs 20, is still weak or nil, the spring 20 subjected to the action of the centrifugal force has a tendency to be progressively, with the speed, pressed against the external edge of the windows in the guide washers and/or in the disc whilst at the same time it deforms so that its axis 21, initially rectilinear, adopts a curved shape whose concavity is turned towards the inside.

The consequences of this are that, on the one hand, parasitic friction is introduced into the damper and, on the other hand, the ends of the elastic members leave the support edges of the windows: thus, during the relative angular movement of the disc and guide washers, control of the torque transmitted will take place only after the ends concerned have resumed contact with the lateral edges. More precisely, referring once again to FIG. 2, and to FIG. 14 which is identical to FIG. 1 except that here the spring 20 is depicted in cross section in order to facilitate understanding of the phenomenon, the most usual embodiment is seen in which the guidance role of the springs 20 is entrusted entirely to the guide washers 2 and 3; this is because, as can be seen in the figures, the end turns of the springs 20 in abutment on the lateral edges 115, 116 are centred by the internal 114 and external 117 edges at their junction with the lateral edges 115, 116 respectively; the flaps 18, 19, and therefore the external edge 117, are semi-circular: the external edge 117 is an arc of a circle centred at 91 which is further towards the outside with respect to the axis 90; consequently, the external edge 17 of the window 11 in the disc 1 is an arc of a circle centred at 92, further towards the outside compared with the point 91; the external edge 17 is consequently an edge with a clearance with respect to the spring 20; however, the ends of the said external edge 17 are practically tangent to the end turn of the spring 20 in the region of its connection to the lateral edges 15 and 16; the internal edge 14 is slightly further towards the inside than the internal edges 114 of the windows 12, 13.

Under the effect of centrifugal force, the spring 20 adopts, initially, with a nil or very small transmitted torque, with the engine idling for example, a configuration as explained above and illustrated by FIG. 15, in which it is pressed against the external edge 117 of the windows 12 and 13, its axis 21 becoming curved and the internal part of the end turns leaving the lateral support edges of the windows; when the speed increases still further, the phenomenon is accentuated as shown in FIG. 16, the end turns moving away from the lateral edges; when the disc 1 is moved with respect to the guide washers 2 and 3, it is the external edge 17 of its windows 11 which initially comes into contact with the end turn of the spring 20, as illustrated in FIG. 17 by the arrow F; this end turn moves, with friction, along the external edge of the disc 1 until it finds its abutment position on the lateral edge 15 of the window 11 in the disc 1, and it is only from the moment when the spring has regained its abutment on the lateral edges 15 and 116 that the torque is transmitted normally.

Naturally, a similar reasoning can be made when the design is such that it is the disc which is chosen for guiding the springs instead of the guide washers.

The aim of the present invention is also to avoid these drawbacks.

According to the invention, a damper of the above type is also characterised by the fact that the said external edge of the windows formed in the guide washers or in the disc has a portion offset radially towards the rotation axis of the input and output elements and extending circumferentially in an area which is not swept by the ends of the elastic members during the relative movement, in one direction or the other, of the input and output elements.

Advantageously, the said external edge is connected to the lateral edges by portions in the shape of an arc of a circle centred on the rotation axis of the input and output elements.

Preferably, between the internally offset portion on the one hand and each of the connecting portions on the other hand, the external edge has clearance portions offset radially towards the outside.

Advantageously, the internally offset portion is in the shape of an arc of a circle whose centre is situated towards the outside with respect to the rotation axis of the input and output elements; the clearance portions are arcs of a circle belonging to the same circle which defines the internally offset portion.

According to a preferred embodiment, the said external edge is the external edge of the windows formed in the guide washers.

The damper according to the invention is well suited to an application to a motor vehicle: the input element is intended to be fixed or fixable to the vehicle engine flywheel, the output element being intended to be connected to the input to the vehicle gearbox.

Another object of the invention is a damping device comprising on the one hand a main damper kinematically acted on directly by the input element and on the other hand a predamper placed directly upstream of the output element, in which the main damper is a torsion damper as above.

In order to give a better understanding of the objects of the present invention, a description will now be given, by way of example, purely illustrative and non-limitative, of the embodiments depicted in the accompanying drawings.

PREFERRED EXAMPLE EMBODIMENTS

Figure 7:
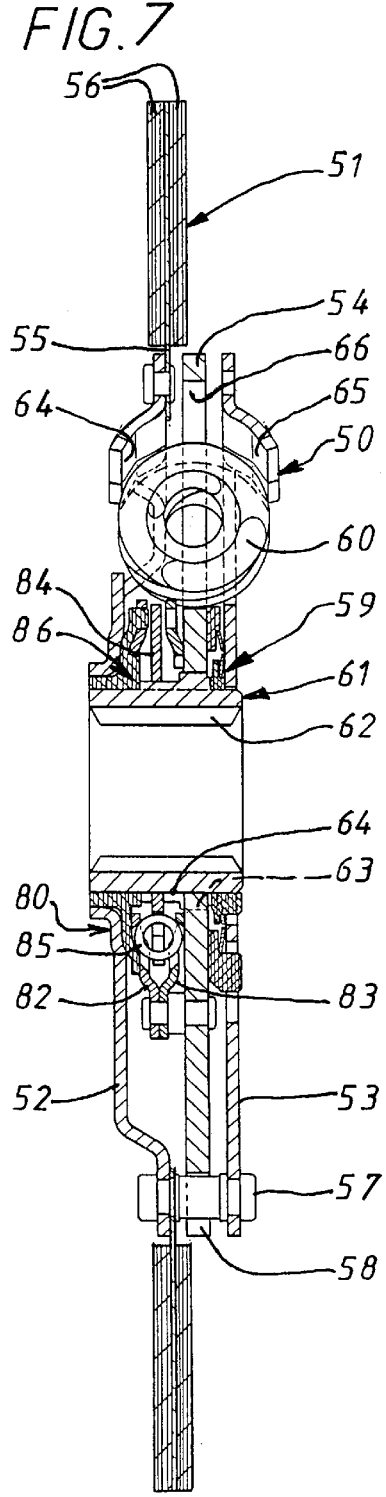
FIG. 7 is a partial view in section of a clutch according to the invention.

Referring to FIG. 7, a main damper 50 can be seen, having an input element 51 here fixed to guide washers 52, 53 disposed on each side of a disc 54. The guide washers 52, 53 are connected together by struts 57 which fix them together. Circumferentially acting elastic members 60, here helical springs, elastically couple the disc 54 to the guide washers 52, 53. The input element 51 consists, in this application to a clutch friction member, of a support disc 55 on each of the faces of which friction linings 56 are fixed, intended to be clamped between the thrust and reaction plates of the clutch.

The friction lining support disc 55 is pressed against one of the guide washers 52 of the main damper 50 whilst being fixed to it by the struts 57.

The struts 57 pass through scallops 58 formed at the periphery of the disc 54; the angular movement between the disc 54 and guide washers 52 and 53 is limited through the cooperation of the struts 57 with the edge of the scallops 58.

The guide washers 52 and 53 surround the output element 61 of the damping device consisting of an internally fluted hub at 62; the same applies to the disc 54 of the main damper 50, which for its part meshes with clearance with external flutes 63 on the hub 61 having a portion 64 of reduced height at one of its ends.

The predamper 80 is located between the disc 54 and one of the guide washers, here the washer 52, of the main damper 50, and this radially below the springs 60 of the said main damper 50. The predamper 80 also has two guide washers 82, 83 disposed on each side of a disc 84 fixed with respect to rotation to the portion 64 of the flutes 63 on the hub 61. Circumferentially acting elastic members 85, here helical springs, elastically couple the guide washers 82, 83 to the disc 84. This disc 84 of the predamper 80 is crimped to the hub 61.

The springs 85 of the predamper 80 are less stiff than the springs 80 of the main damper 50.

The predamper 80 is adapted to filter the vibrations notably in the idling range of the engine, whilst the main damper 50 is adapted to filter the vibrations in the normal operating range of the vehicle, referred to as the running range. Each of the dampers 50, 80 has a specific axially acting friction device 59, 86, in a manner known per se.

Figure 1:
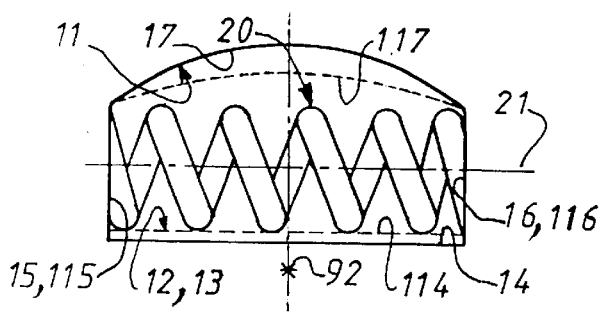
FIGS. 1 to 6 are explanatory diagrams relating to the prior art already commented on above.
Figure 2:
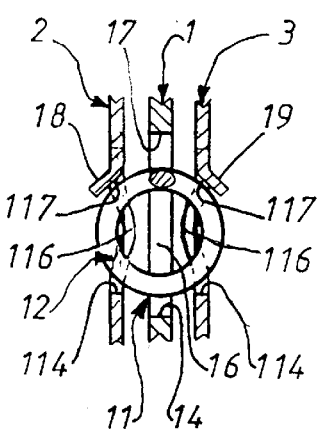
Figure 3:
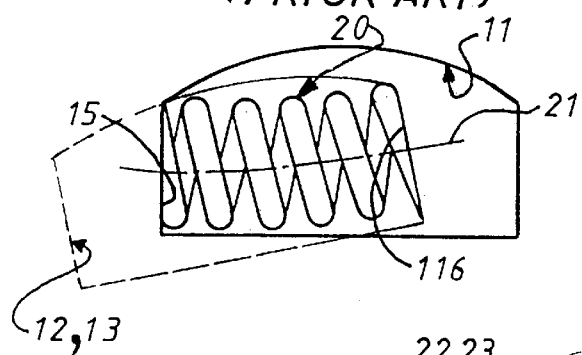
Figure 4:
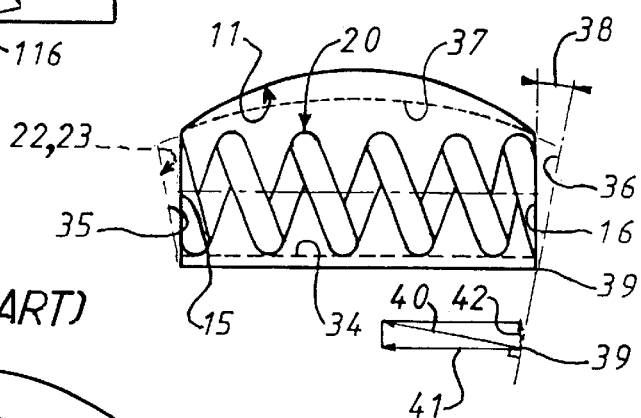
Figure 5:
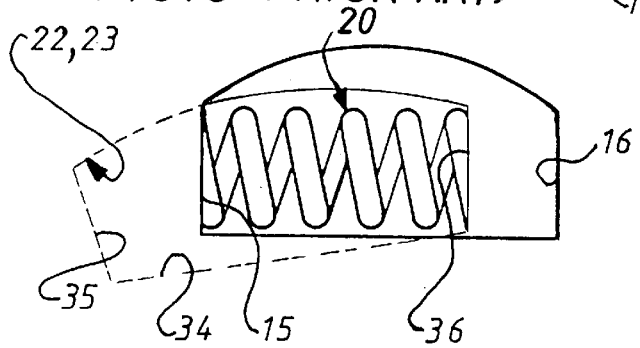
Figure 6:
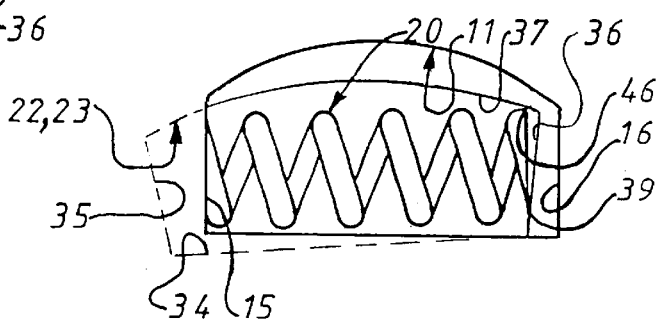

The springs 60 of the main damper are placed in windows placed opposite each other formed in the guide washers 52, 53 and in the disc 54. In order not to complicate the drawing, and to facilitate the explanation, these windows have been superimposed in the diagram in FIG. 8, as with FIG. 1. The windows 64, 65 are formed in the guide washers 52, 53, and the window 66 in the disc 54. These windows have lateral edges 75 and 76 serving as an abutment for the springs 60; according to the invention, the lateral edges 75, 76 of each of the windows 64, 65, 66 form between them an angle 67 open towards the outside, and the axis 70 around which the turns of the helical springs 60 are wound is a non-rectilinear curve with its concavity directed towards the common rotation axis of the input 51 and output 61 elements, so that the bearing faces of the ends of the springs 80 form between them the same angle 67.

Figure 8:
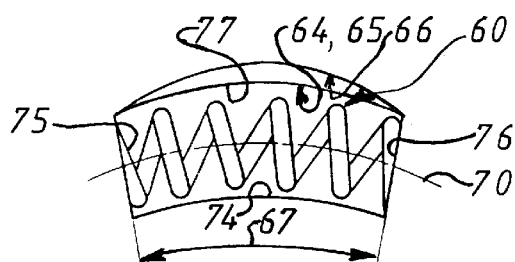
FIG. 8 is a partial plan view showing schematically the windows and springs of the clutch of FIG. 7.
Figure 10:
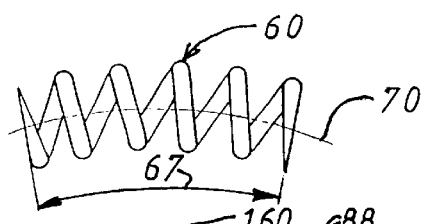
FIG. 10 is a plan view showing a spring alone according to the invention.

According to FIG. 8, the axis 70 is a curvilinear curve in the shape of an arc of a circle; the spring 60 in FIG. 8 is depicted alone, in the idle state, in FIG. 10.

Figure 9:
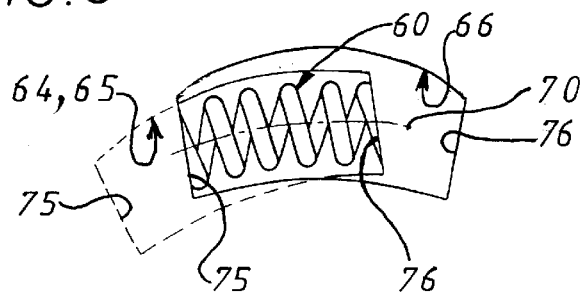
FIG. 9 is a view similar to FIG. 8, the angular movement between the input and output elements being at a maximum.
Figure 11:
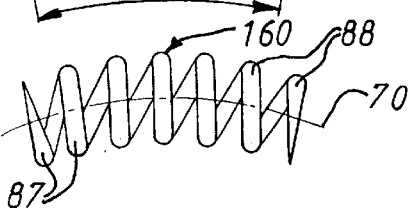
FIGS. 11 to 13 each show a variant of a spring according to the invention.
Figure 12:
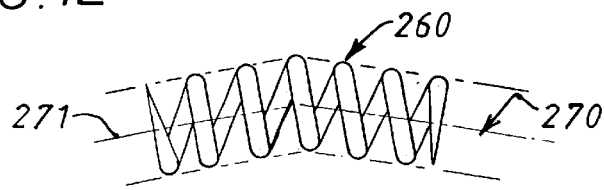
Figure 13:
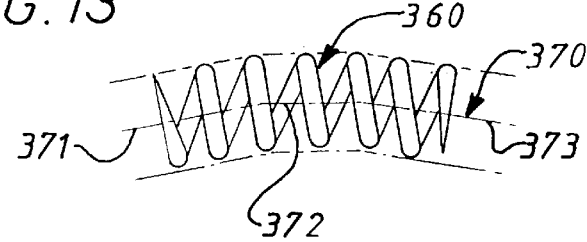
Figure 14:
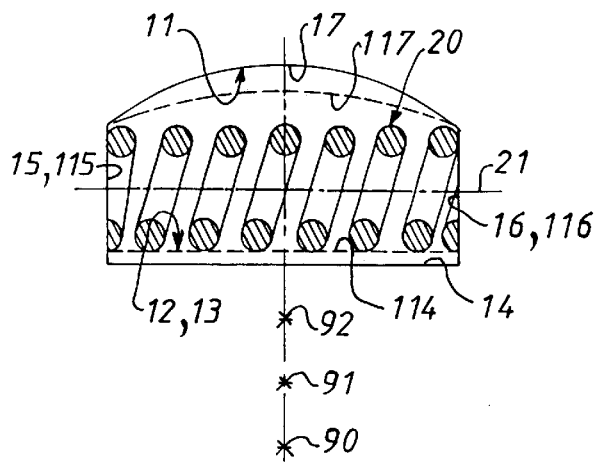
FIGS. 14 to 17 are explanatory diagrams relating to the prior art, already commented on above.
Figure 15:
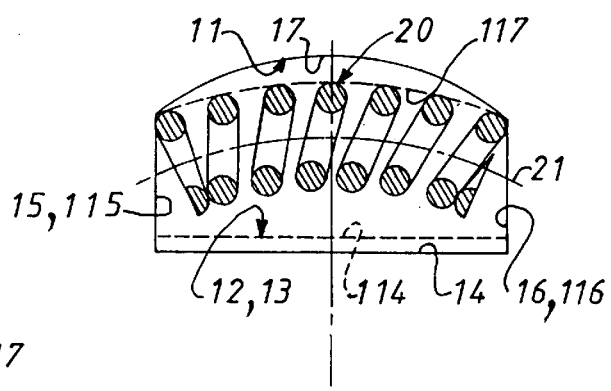
Figure 16:
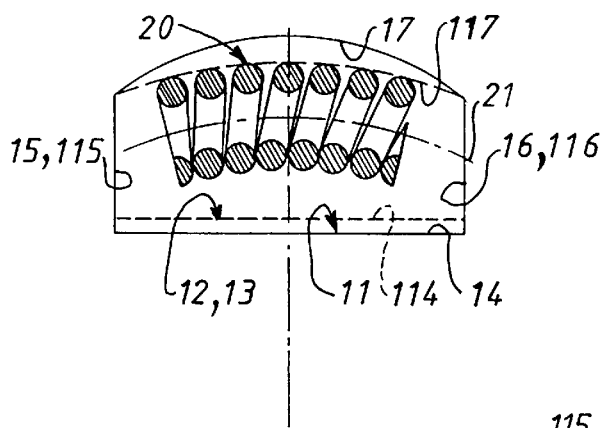
Figure 17:
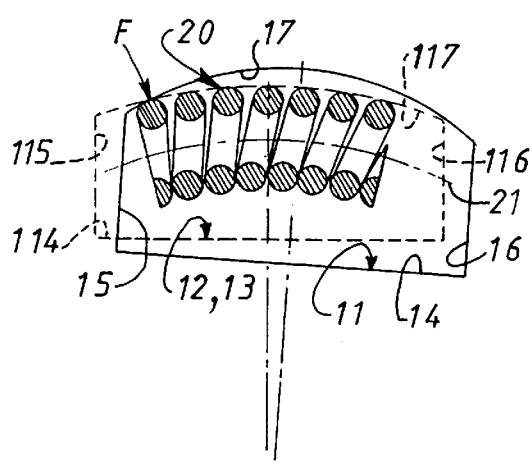

FIGS. 11 to 13 show variant springs; according to FIG. 11, the turns of the spring 160 are wound around an axis 70 similar to that in FIG. 9, but here the end turns 87 on the one hand and 88 on the other hand are closer than the other turns of the spring 160; according to the variant in FIG. 12, the axis 270 of the spring 260 consists of two rectilinear half-axes 271, 272 forming an obtuse angle between them; according to the variant in FIG. 13, the axis 370 of the spring 360 consists of three rectilinear segments 371, 372, 373 forming in pairs an obtuse angle between them.

Advantageously, the angle 67 which the lateral edges 75, 76 of the windows 64, 65, 66 form between them is such that, when the guide washers 52, 53 and the disc 54 have effected their maximum relative movement in rotation, the lateral edges 76 of the windows 64, 65 of the guide washers 52, 53 on which one end of the springs 60 bears and the lateral edge 75 of the window 66 in the disc 54 on which the other end of the springs 60 bears are parallel, as illustrated in FIG. 9.

Thus, by virtue of the invention, the springs 60 work under good conditions and the parasitic friction is minimised to the maximum possible extent, or even eliminated. It will also be appreciated that, the springs 60 having an axis 70 as defined above, it is possible, as can be seen in FIGS. 8 and 9, to give the internal edge 74 of the windows a corresponding shape resulting, for equal window surface areas, in more space circumferentially.

Figure 18:
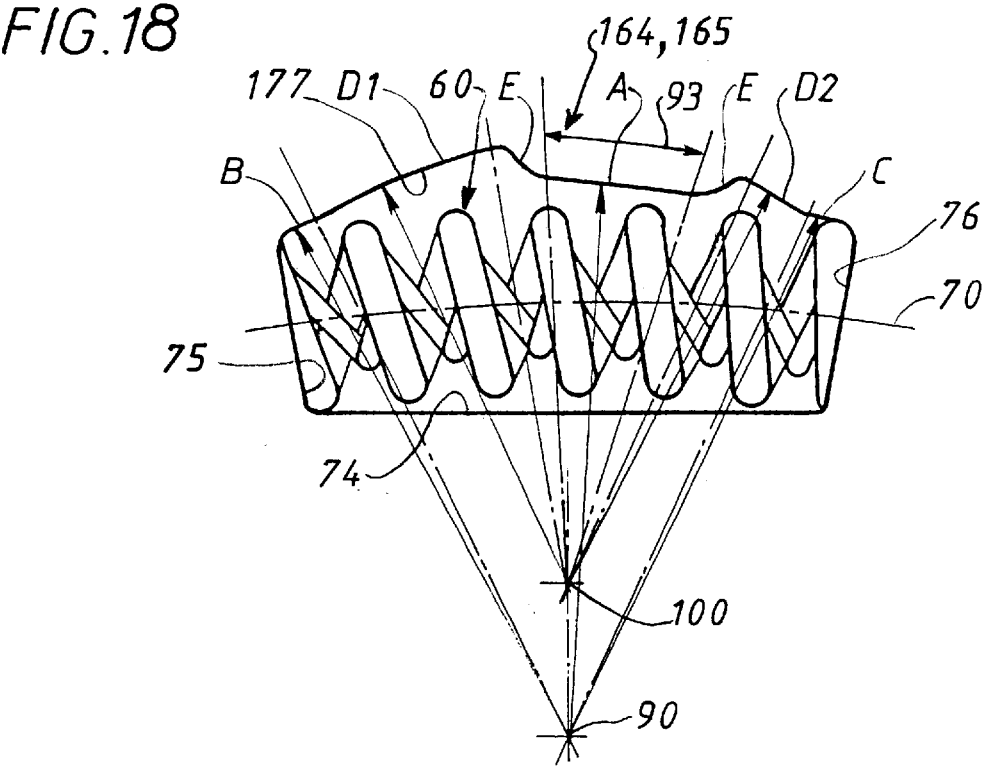
FIG. 18 is a plan view of a variant of windows according to the invention adapted also to resolve the problems related to centrifugal force.
Figure 19:
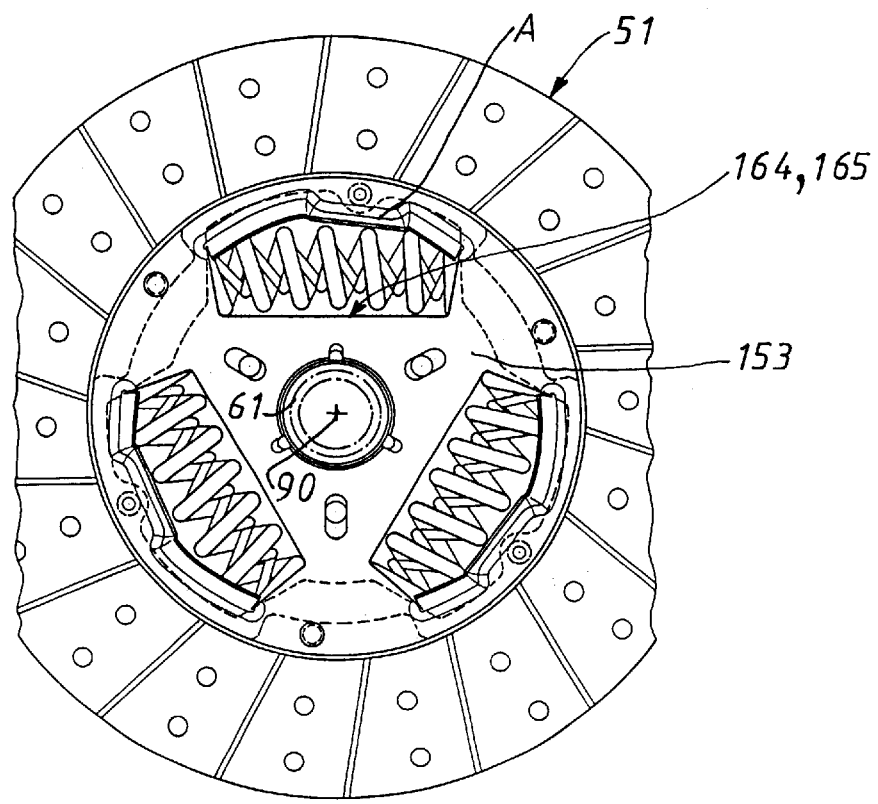
FIG. 19 is a plan view of a friction disc equipped with windows according to FIG. 18.

FIGS. 18 and 19 show the variant according to which account is also taken of the centrifugal force to which the springs are subjected; according to this variant, the external edge 177 of the windows 164, 165 formed in the guide washers, one of them, the washer 153, being visible in FIG. 19, has a portion A which is offset internally, that is to say radially towards the rotation axis 90 of the input 51 and output 61 elements. This radial offset is such that the portion A is as close as possible to the external contour of the spring 60; as will easily be understood, this portion A makes it possible to limit considerably the deformation of the spring 60 under the effect of centrifugal force; this portion A extends circumferentially in an area 93 which is not swept by the end turns of the spring 60 during the relative movement of the input 51 and output 61 elements, this being valid in one direction or the other, that is to say in the driving direction where the engine of the vehicle drives the wheels thereof and which corresponds to a movement of the windows in the disc in the clockwise direction about the axis 90, as seen in FIG. 18, with respect to the windows in the guide washers, as well as in the retro direction in which the wheels of the vehicle are driving with respect to the vehicle engine, which corresponds to a movement of the windows in the disc in the reverse direction compared with the previous one; in the above two cases, the angular movements are not equal, the movement being greater in the first case: consequently, as shown in FIG. 18, the portion A is offset circumferentially in the direction which corresponds to the direction of rotation of the vehicle engine.

The invention also makes provision for connecting the external edge 177 to the lateral edges 75, 76 by means of the portions B and C in the shape of an arc of a circle whose centre is merged with the rotation axis 90 of the input 51 and output 61 elements: by virtue of this arrangement, the end turns will, in spite of the centrifugal effect, always remain maintained in the angle formed by the lateral edges 75, 76 and the portions B and C, and, during the angular movement, the action on the springs by the disc will always take place through the lateral edges of the windows in the disc, that is to say without parasitic friction, the external edge of the windows in the disc being free with respect to the portions B and C.

Naturally, the portions A on the one hand and B and C on the other hand are separated by clearance portions D, D2, that is to say ones offset radially towards the outside with respect to them.

In order to simplify the design, the internally offset portion A is in the shape of an arc of a circle whose centre 100 is situated towards the outside with respect to the axis 90; for the same reason, the clearance portions D1, D2 are also arcs of a circle belonging to the same circle which defines the internally offset portion A.

Naturally, in all the above, the circumferentially acting elastic means can consist, in each group of windows, of a single helical spring, or two concentric helical springs, as shown in FIGS. 7, 18 and 19.

What is claimed is:

1. Torsion damper disposed between two rotating elements, an input element (51) and an output element (61), and having circumferentially acting elastic members (60), two guide washers (52, 53–153) associated with one (51) of the elements and disposed axially on each side of a disc (54) associated with the other one (61) of the elements, the circumferentially acting elastic members (60) having an axis (70) and acting between the two guide washers (52, 53–153) and the disc (54) whilst being placed in windows (64–164, 65–165, 66) placed opposite each other and formed in the guide washers (52, 53–153) and in the disc (54), said windows (64–164, 65–165, 66) having two lateral edges (75, 76) on which the ends of the elastic members (60) are adapted to be in abutment, wherein the lateral edges (75, 76) of each of the said windows (64–164, 65–165, 66) formed respectively in the guide washers (52, 53–153) and in the disc (54) form between them a window angle (67) open towards a radially outside direction, the axis (70) of the elastic members (60) being a non-rectilinear curve with its concavity directed towards the common rotational axis of the input (51) and the output (61) elements, so that bearing faces of the ends of the elastic members (60) form a bearing angle substantially equal to said window angle (67).

2. Damper according to claim 1, characterised by the fact that the said angle (67) is such that, when the guide washers (52, 53–153) and the disc (54) have effected their maximum relative movement in rotation, the lateral edges (75–76) of the windows (64–164, 65–165) in the guide washers (52, 53–153) on which one end of the elastic members (60) bear and the lateral edge (76–75) of the window (66) in the disc (54) on which the other end of the elastic members (60) bears are parallel, or almost parallel.

3. Damper according to claim 1, characterised by the fact that the axis (70) of the elastic members (60) is a curvilinear curve in the shape of an arc of a circle.

4. Damper according to claim 1, characterised by the fact that the axis (270) of the elastic members (260) consists of two rectilinear half-axes (271, 272) forming an obtuse angle between them.

5. Damper according to claim 1, characterised by the fact that the axis (370) of the elastic members (360) consists of three rectilinear segments (371, 372, 373) forming, in pairs, an obtuse angle between them.

6. Damper according to claim 1, characterised by the fact that the elastic members are helical springs coiled about their axis and the end turns (87, 88) of the springs (160) are closer together than the other turns.

7. Damper according to claim 1, characterised by the fact that the said external edge (177) of the windows formed in the guide washers or in the disc has a portion (A) offset internally, that is to say radially towards the rotation axis (90) of the input (51) and output (61) elements, and extending circumferentially in an area (93) which is not swept by the ends of the elastic members (60) during the relative rotational movement, in one direction or the other, of the input (51) and output (61) elements.

8. Damper according to claim 1, characterised by the fact that a external edge (177) is connected to the lateral edges (75, 76) by portions (B, C) in the shape of an arc of a circle centred on the rotation axis (90) of the input (51) and output (61) elements.

9. Damper according to claim 1, characterised by the fact that, between an internally offset portion (A) on the one hand and each of the connecting portions (B, C) on the other hand, the external edge (177) has clearance portions (D, D2) offset radially towards the outside.

10. Damper according to claim 1, characterised by the fact that an internally offset portion (A) of said external edge (177) is in the shape of an arc of a circle whose centre (100) is situated towards the outside with respect to the rotation axis (90) of the input (51) and output (61) elements.

11. Damper according to claim 1, characterised by the fact that clearance portions (D, D2) are arcs of a circle belonging to the same circle which defines the internally offset portion (A).

12. Damper according to claim 1, characterised by the fact that the said external edge (177) is the external edge of the windows (164, 165) formed in the guide washers (153).

13. Damper according to claim 1, further comprising a friction device (59) associated with the elastic members.

14. Damper according to claim 1, for a motor vehicle, characterised by the fact that the input element (51) is fixable to the vehicle engine flywheel, the output element (61) being intended to be connected to the input of the vehicle gearbox.

* * * * *